United States Patent
Yang

(10) Patent No.: US 8,376,886 B2
(45) Date of Patent: Feb. 19, 2013

(54) COAXIAL EPICYCLIC GEAR TRAIN WITH BIDIRECTIONAL INPUT AND ONE-WAY OUTPUT

(76) Inventor: Tai-Her Yang, Dzan-Hwa (TW)

(*) Notice: Subject to any disclaimer, the term of this patent is extended or adjusted under 35 U.S.C. 154(b) by 438 days.

(21) Appl. No.: 12/699,143

(22) Filed: Feb. 3, 2010

(65) Prior Publication Data

US 2011/0190087 A1 Aug. 4, 2011

(51) Int. Cl.
*F16H 48/00* (2006.01)
*F16H 48/06* (2006.01)
*G16H 3/44* (2006.01)

(52) U.S. Cl. .......... 475/12; 475/230; 475/294; 475/297

(58) Field of Classification Search .............. 475/12, 475/230, 243, 245, 246, 294, 297; 74/810.1
See application file for complete search history.

(56) References Cited

U.S. PATENT DOCUMENTS

| 3,433,097 | A | * | 3/1969 | Fox | 475/294 |
| 4,446,757 | A | * | 5/1984 | La Fever | 475/12 |
| 5,531,651 | A | * | 7/1996 | Yang | 475/12 |
| 5,607,369 | A | * | 3/1997 | Yang | 475/12 |
| 8,257,220 | B2 | * | 9/2012 | Yang | 475/287 |
| 2008/0236332 | A1 | * | 10/2008 | Hoose et al. | 74/810.1 |
| 2011/0190085 | A1 | * | 8/2011 | Yang | 475/12 |

FOREIGN PATENT DOCUMENTS

JP 2004084783 A * 3/2004

* cited by examiner

*Primary Examiner* — Roger Pang
(74) *Attorney, Agent, or Firm* — Bacon & Thomas, PLLC

(57) ABSTRACT

For the coaxial epicyclic gear train with bidirectional input and one-way output, by way of the epicyclic gear train and the integrated one-way transmission to constitute the epicyclic gear train, in which the rotary direction driving the input shaft of the gear train with bidirectional input and one-way output is changed, and the rotary direction at the output shaft is constant.

14 Claims, 7 Drawing Sheets

COAXIAL EPICYCLIC GEAR TRAIN WITH BIDIRECTIONAL INPUT AND ONE-WAY OUTPUT

BACKGROUND OF THE INVENTION (a) Field of the Invention

For the coaxial epicyclic gear train with bidirectional input and one-way output, the external transmission structure of the epicyclic gear train integrates with the one-way transmission to implement the transmission operation with bidirectional input and one-way output for the epicyclic gear train; for the coaxial epicyclic gear train with bidirectional input and one-way output, if the input shaft is driven at the first rotary direction and at the second rotary direction, respectively, there are different transmission ratios occurring at the one-way output shaft, while there is same transmission ratio between the bidirectional input shaft and the one-way output shaft; thus the limitation of the coaxial gear train with bidirectional input and one-way output constituted by the planetary type transmission gear train is resolved, in which the internal transmission structure cannot make the transmission ratio between the input shaft driven at the first rotary direction and the output shaft and that between the input shaft driven at the second rotary direction and the output shaft without difference to implement one-way output.

(b) Description of the Prior Art

The conventional gear train with bidirectional input and constant rotary direction output is limited, which is constituted by the planetary type transmission gear train, because the internal transmission structure cannot make the transmission ratio between the input shaft driven at the first rotary direction and the output shaft and that between the input shaft driven at the second rotary direction and the output shaft without difference to implement one-way output.

SUMMARY OF THE INVENTION

For the coaxial epicyclic gear train with bidirectional input and one-way output, by way of the epicyclic gear train and the integrated one-way transmission to constitute the epicyclic gear train, in which the rotary direction driving the input shaft of gear train with bidirectional input and one-way output is changed, and the rotary direction at the output shaft is constant, and it is characterized by that the external transmission structure of the epicyclic gear train integrates with the one-way transmission to implement the transmission operation with bidirectional input and one-way output for the epicyclic gear train; for the coaxial epicyclic gear train with bidirectional input and one-way output, if the input shaft is driven at the first rotary direction and at the second rotary direction, respectively, there are different transmission ratios occurring at the one-way output shaft, while there is same transmission ratio between the bidirectional input shaft and the one-way output shaft; thus the limitation of the coaxial gear train with bidirectional input and one-way output constituted by the planetary type transmission gear train is resolved, in which the internal transmission structure cannot make the transmission ratio between the input shaft driven at the first rotary direction and the output shaft and that between the input shaft driven at the second rotary direction and the output shaft without difference to implement one-way output.

Figure 1:
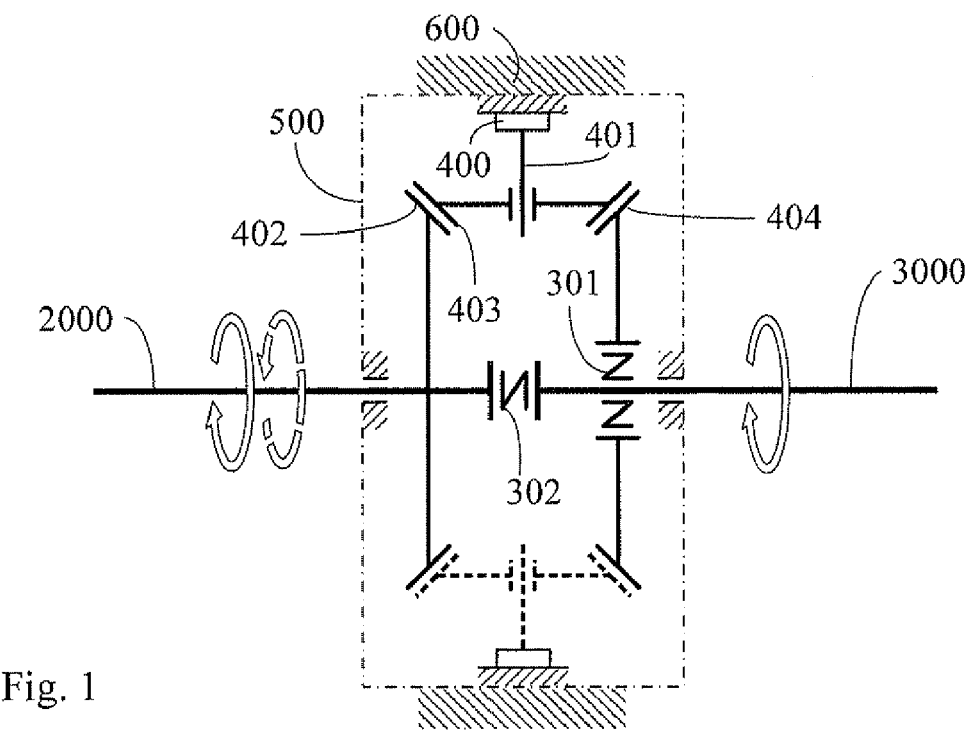
FIG. 1 is a structural schematic view showing the 1st embodiment of the coaxial epicyclic gear train with bidirectional input and one-way output constituted by the epicyclic gear train, according to the present invention.

DESCRIPTION OF MAIN COMPONENT SYMBOLS (301), (302), (303), (305): One-way transmission
(400): Epicyclic gear support arm annular shelf
(401): Epicyclic gear shaft
(402): Inner bevel wheel
(403): Epicyclic gear
(404): Outer bevel wheel
(500): Shell of the transmission gear train (600): Machine body
(2000): Input shaft
(3000): Output shaft

DETAILED DESCRIPTION OF THE PREFERRED EMBODIMENTS

For the coaxial epicyclic gear train with bidirectional input and one-way output, the structural types include the input shaft and the output shaft coaxially installed in series, or the both coaxial fitting;

the main features are as following:

transmission component: related to the epicyclic gear train constituted by gears and/or friction wheels;

the forward and reverse rotary power source deriving from one or more of the following power source, including human power, machine power, electric motors, hydraulic motors or pneumatic motors; including:

1) the forward and reversely driven by human power; or
2) the forward and reversely driven by machine power; or
3) the forward and reversely driven by hydraulic or pneumatic motors; or
4) the forward and reversely driven by electric motors; or
5) driven at different directions by the rotary power sources from 1)~4).

The operational features of the coaxial epicyclic gear train with bidirectional input and one-way output are as following:

the first rotary direction and the second rotary direction are reverse;

if the input terminal is driven by the first rotary direction, the first rotary direction output is produced through the first driving gear train driving the output terminal;

if the input terminal is driven by the second rotary direction, the first rotary direction output is produced through the second driving gear train driving the output terminal;

an one-way transmission is installed between the first driving gear train and the second driving gear train to avoid the interference from the second driving gear train when the first driving gear train is used to be the first rotary direction input and produces the first rotary direction output; and an one-way transmission is installed between the second driving gear train and the first driving gear train to avoid the interference from the first driving gear train when the second driving gear train is used to be the second rotary direction input and produces the first rotary direction output.

Some embodiments are provided as following to describe the enforceability of the coaxial epicyclic gear train with bidirectional input and one-way output, and the other embodiments with same functions are omitted.

The following are a variety of structural types of the coaxial epicyclic gear train with bidirectional input and one-way output, the structural descriptions are as following:

As shown in FIGS. 1 to 14, the coaxial epicyclic gear train with bidirectional input and one-way output is constituted by the epicyclic gear train, and the input shaft and the output shaft are coaxially installed in series, including:

FIG. 1 is a structural schematic view showing the 1st embodiment of the coaxial epicyclic gear train with bidirectional input and one-way output constituted by the epicyclic gear train, according to the present invention.

As shown in FIG. 1, the coaxial epicyclic gear train with bidirectional input and one-way output is constituted by the epicyclic gear train with the input shaft and the output shaft coaxially installed in series, the main components including:

one end of the input shaft (2000) through installed at one side of the shell of the transmission gear train (500) via bearing structure, another end of the input shaft (2000) and the output shaft (3000) coaxially installed in series via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) integrated with the inner bevel wheel (402);

an epicyclic gear (403) installed between an outer bevel wheel (404) and an inner bevel wheel (402); the center of the epicyclic gear (403) rotating at an epicyclic gear shaft (401); and one end of the epicyclic gear shaft (401) fixed at the shell of the transmission gear train (500);

the shell of the transmission gear train (500) fixed at the machine body (600);

the one-way transmission (301) installed between the outer bevel wheel (404) and the output shaft (3000);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the inner bevel wheel (402) for further driving the epicyclic gear (403) and the outer bevel wheel (404), and through the outer bevel wheel (404) and the one-way transmission (301), for driving the output shaft (3000) to produce the first rotary direction output to constitute the second driving gear train.

Figure 2:
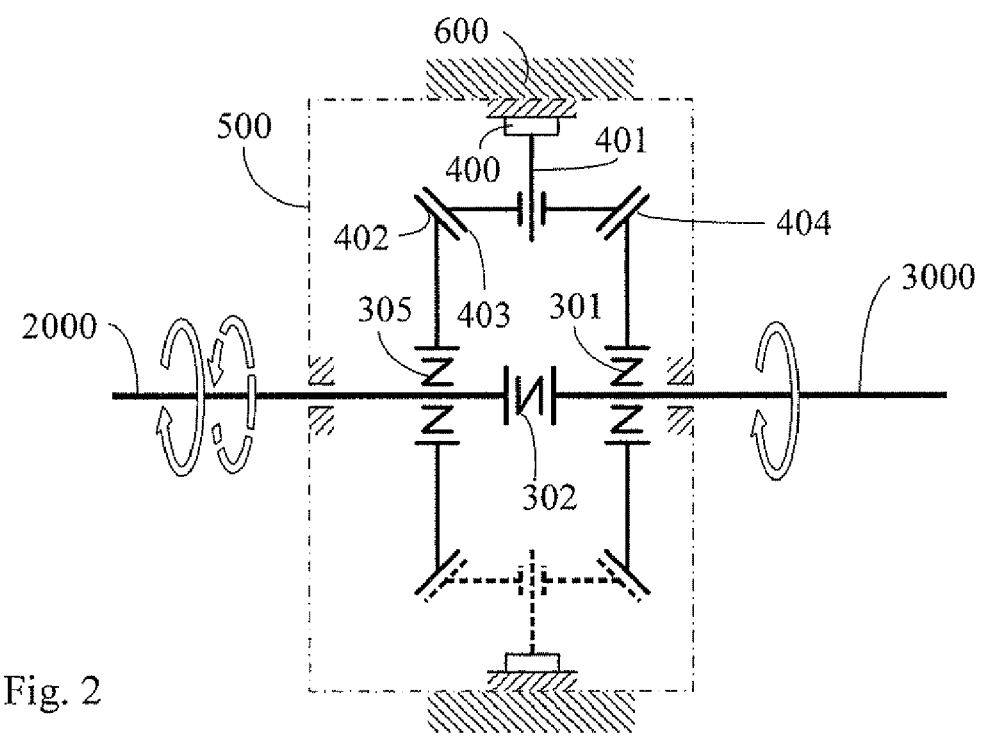
FIG. 2 is a structural schematic view showing the 2nd embodiment of the coaxial epicyclic gear train with bidirectional input and one-way output constituted by the epicyclic gear train, according to the present invention.

FIG. 2 is a structural schematic view showing the 2nd embodiment of the coaxial epicyclic gear train with bidirectional input and one-way output constituted by the epicyclic gear train, according to the present invention.

As shown in FIG. 2, the coaxial epicyclic gear train with bidirectional input and one-way output is constituted by the epicyclic gear train with the input shaft and the output shaft coaxially installed in series, the main components including:

one end of the input shaft (2000) through installed at one side of the shell of the transmission gear train (500) via bearing structure, another end of the input shaft (2000) and the output shaft (3000) coaxially installed in series via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) through the inner bevel wheel (402), and the one-way transmission (305) installed between the above both;

an epicyclic gear (403) installed between an outer bevel wheel (404) and an inner bevel wheel (402); the center of the epicyclic gear (403) rotating at an epicyclic gear shaft (401); and one end of the epicyclic gear shaft (401) fixed at the shell of the transmission gear train (500);

the shell of the transmission gear train (500) fixed at the machine body (600);

the one-way transmission (301) installed between the outer bevel wheel (404) and the output shaft (3000);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the one-way transmission (305) for driving the inner bevel wheel (402) and for further driving the epicyclic gear (403) and the outer bevel wheel (404), and through the outer bevel wheel (404) and the one-way transmission (301), for driving the output shaft (3000) to produce the first rotary direction output to constitute the second driving gear train.

Figure 3:
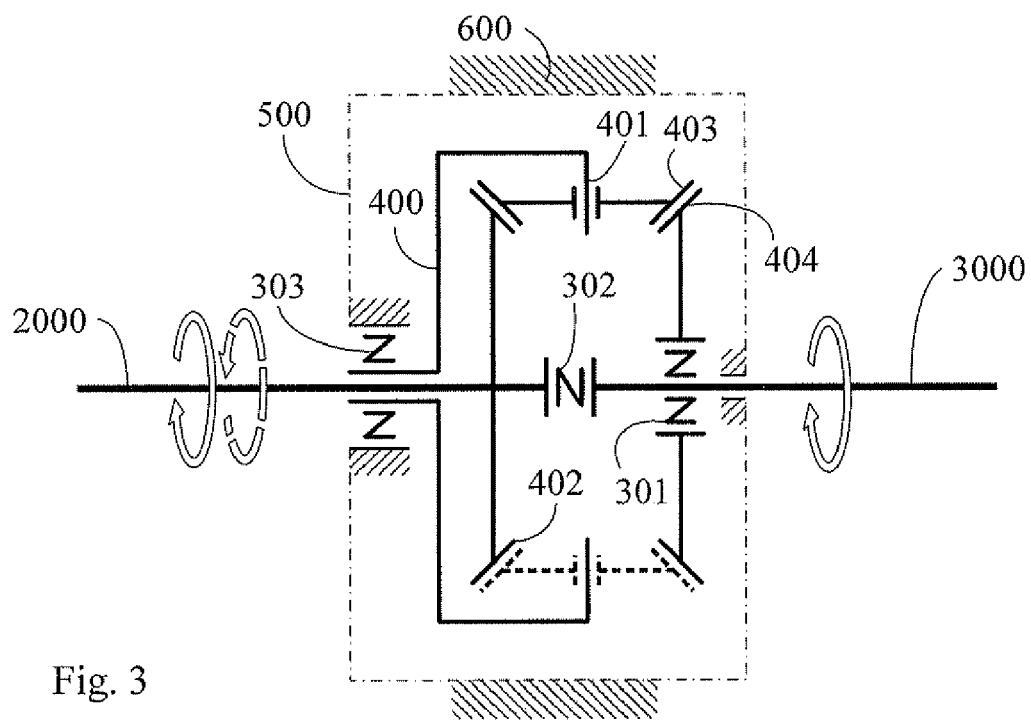
FIG. 3 is a structural schematic view showing the 3rd embodiment of the coaxial epicyclic gear train with bidirectional input and one-way output constituted by the epicyclic gear train, according to the present invention.

FIG. 3 is a structural schematic view showing the 3rd embodiment of the coaxial epicyclic gear train with bidirectional input and one-way output constituted by the epicyclic gear train, according to the present invention.

As shown in FIG. 3, the coaxial epicyclic gear train with bidirectional input and one-way output is constituted by the epicyclic gear train with the input shaft and the output shaft coaxially installed in series, the main components including:

one end of the input shaft (2000) through installed at an epicyclic gear support arm annular shelf (400) via bearing structure, the epicyclic gear support arm annular shelf (400) integrated with one side of the shell of the transmission gear train (500) via the one-way transmission (303), and another end of the input shaft (2000) and the output shaft (3000) coaxially installed in series via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) integrated with the inner bevel wheel (402);

the epicyclic gear (403) installed between the outer bevel wheel (404) and the inner bevel wheel (402); the center of the epicyclic gear (403) rotating at the epicyclic gear shaft (401), one end of the epicyclic gear shaft (401) integrated with the epicyclic gear support arm annular shelf (400), and rotating between the input shaft (2000) and the one-way transmission (303);

the shell of the transmission gear train (500) fixed at the machine body (600);

the outer bevel wheel (404) surrounding the output shaft (3000) via the one-way transmission (301);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the inner bevel wheel (402), the epicyclic gear (403), and the outer bevel wheel (404), and then through the one-way transmission (301), for driving the output shaft (3000) to produce the first rotary direction output to constitute the second driving gear train.

Figure 4:
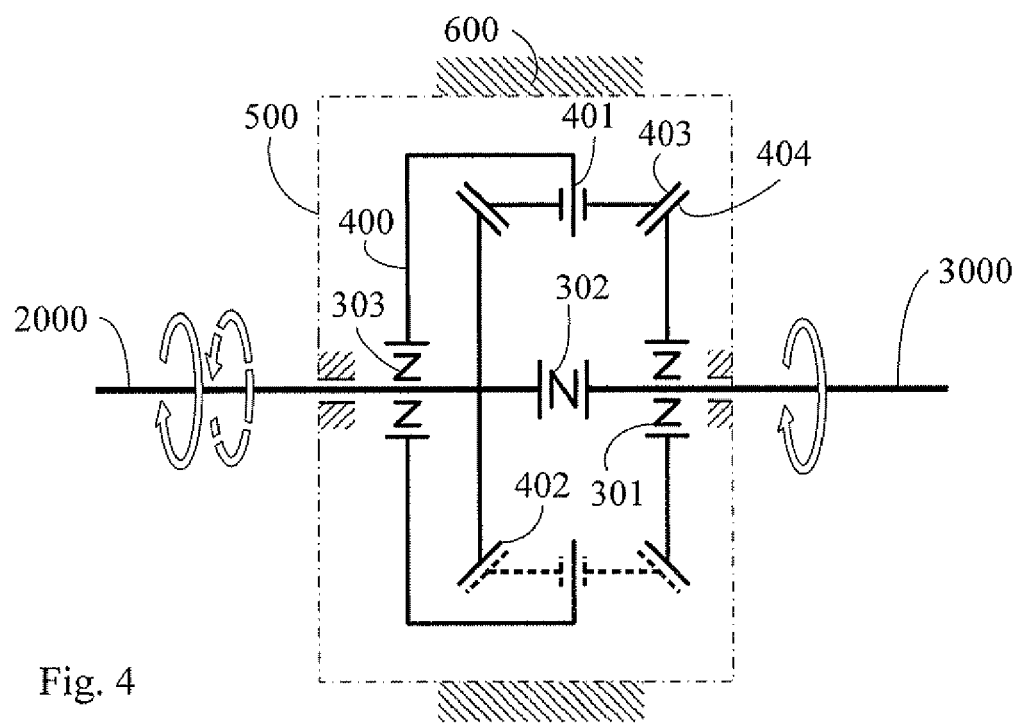
FIG. 4 is a structural schematic view showing the 4th embodiment of the coaxial epicyclic gear train with bidirectional input and one-way output constituted by the epicyclic gear train, according to the present invention.

FIG. 4 is a structural schematic view showing the 4th embodiment of the coaxial epicyclic gear train with bidirectional input and one-way output constituted by the epicyclic gear train, according to the present invention.

As shown in FIG. 4, the coaxial epicyclic gear train with bidirectional input and one-way output is constituted by the epicyclic gear train with the input shaft and the output shaft coaxially installed in series, the main components including:

one end of the input shaft (2000) through installed at one side of the shell of the transmission gear train (500) via bearing structure, another end of the input shaft (2000) and the output shaft (3000) coaxially installed in series via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) integrated with the inner bevel wheel (402);

the epicyclic gear (403) installed between the outer bevel wheel (404) and the inner bevel wheel (402); the center of the epicyclic gear (403) rotating at the epicyclic gear shaft (401), one end of the epicyclic gear shaft (401) integrated with the epicyclic gear support arm annular shelf (400), and the epicyclic gear support arm annular shelf (400) rotating at the input shaft (2000) between the shell of the transmission gear train (500) and the inner bevel wheel (402) via the one-way transmission (303);

the shell of the transmission gear train (500) fixed at the machine body (600);

the outer bevel wheel (404) surrounding the output shaft (3000) via the one-way transmission (301);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the inner bevel wheel (402), the epicyclic gear (403), and the outer bevel wheel (404), and then through the one-way transmission (301), for driving the output shaft (3000) to produce the first rotary direction output to constitute the second driving gear train.

Figure 5:
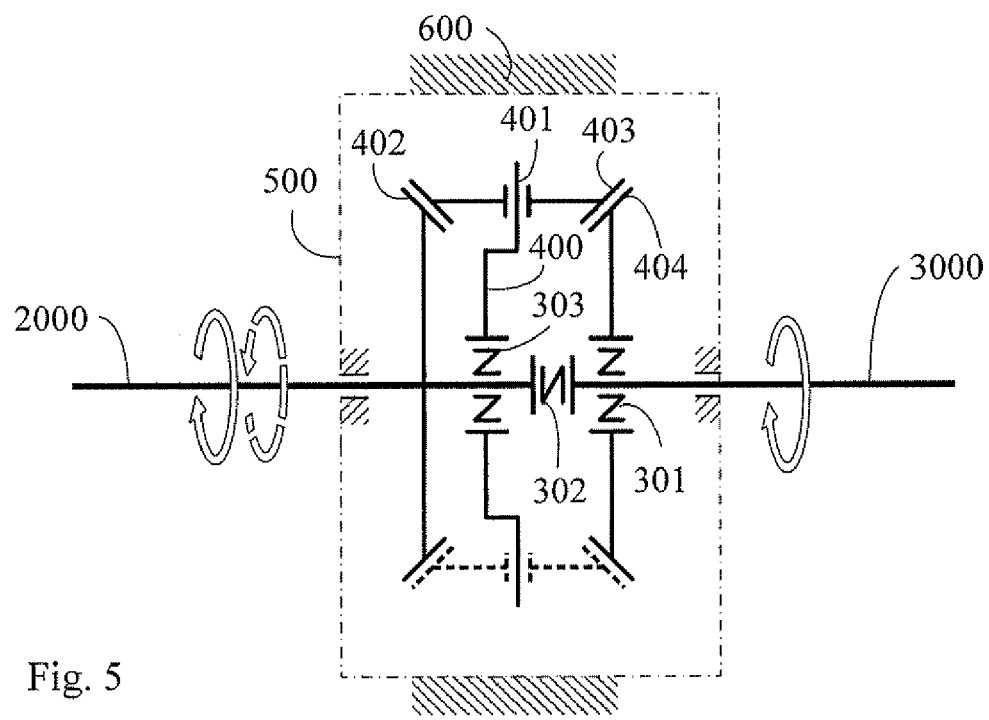
FIG. 5 is a structural schematic view showing the 5th embodiment of the coaxial epicyclic gear train with bidirectional input and one-way output constituted by the epicyclic gear train, according to the present invention.

FIG. 5 is a structural schematic view showing the 5th embodiment of the coaxial epicyclic gear train with bidirectional input and one-way output constituted by the epicyclic gear train, according to the present invention.

As shown in FIG. 5, the coaxial epicyclic gear train with bidirectional input and one-way output is constituted by the epicyclic gear train with the input shaft and the output shaft coaxially installed in series, the main components including:

one end of the input shaft (2000) through installed at one side of the shell of the transmission gear train (500) via bearing structure, another end of the input shaft (2000) and the output shaft (3000) coaxially installed in series via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) integrated with the inner bevel wheel (402);

the epicyclic gear (403) installed between the outer bevel wheel (404) and the inner bevel wheel (402); the center of the epicyclic gear (403) rotating at the epicyclic gear shaft (401), the epicyclic gear shaft (401) integrated with the epicyclic gear support arm annular shelf (400) installed between the inner bevel wheel (402) and the one-way transmission (302), and the one-way transmission (303) installed between the epicyclic gear support arm annular shelf (400) and the input shaft (2000);

the shell of the transmission gear train (500) fixed at the machine body (600);

the outer bevel wheel (404) surrounding the output shaft (3000) via the one-way transmission (301);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the inner bevel wheel (402), the epicyclic gear (403), and the outer bevel wheel (404), and then through the one-way transmission (301), for driving the output shaft (3000) to produce the first rotary direction output to constitute the second driving gear train.

Figure 6:
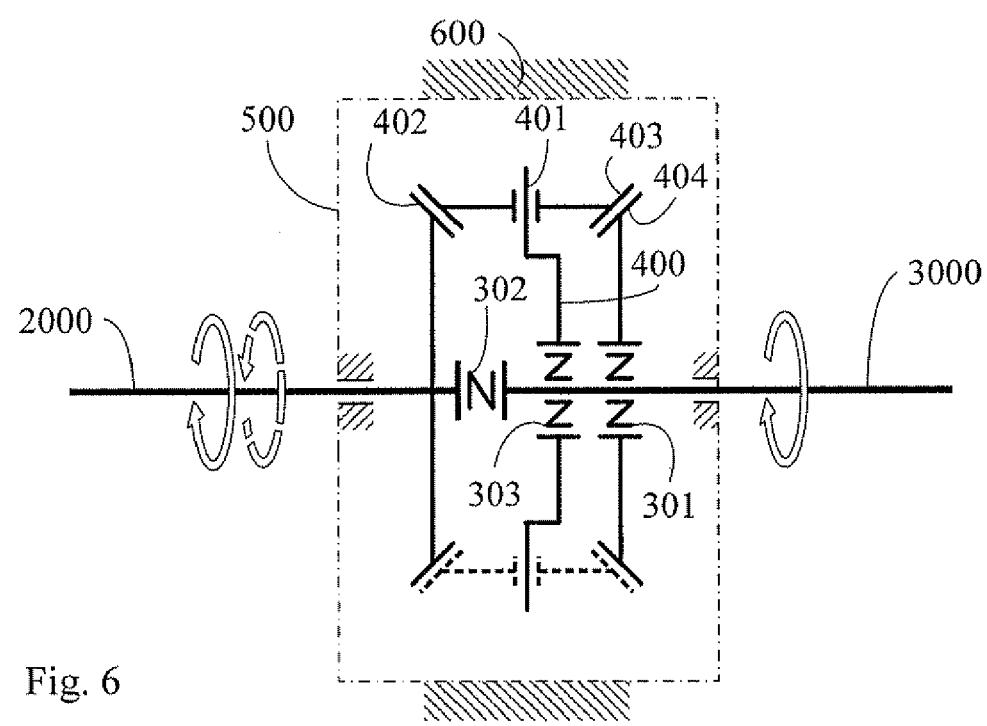
FIG. 6 is a structural schematic view showing the 6th embodiment of the coaxial epicyclic gear train with bidirectional input and one-way output constituted by the epicyclic gear train, according to the present invention.

FIG. 6 is a structural schematic view showing the 6th embodiment of the coaxial epicyclic gear train with bidirectional input and one-way output constituted by the epicyclic gear train, according to the present invention.

As shown in FIG. 6, the coaxial epicyclic gear train with bidirectional input and one-way output is constituted by the epicyclic gear train with the input shaft and the output shaft coaxially installed in series, the main components including:

one end of the input shaft (2000) through installed at one side of the shell of the transmission gear train (500) via bearing structure, another end of the input shaft (2000) and the output shaft (3000) coaxially installed in series via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) integrated with the inner bevel wheel (402);

the epicyclic gear (403) installed between the outer bevel wheel (404) and the inner bevel wheel (402); the center of the epicyclic gear (403) rotating at the epicyclic gear shaft (401), the epicyclic gear shaft (401) integrated with the epicyclic gear support arm annular shelf (400) installed at the output shaft (3000), and the one-way transmission (303) installed between the epicyclic gear support arm annular shelf (400) and the output shaft (3000);

the shell of the transmission gear train (500) fixed at the machine body (600);

the outer bevel wheel (404) surrounding the output shaft (3000) via the one-way transmission (301);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the inner bevel wheel (402), the epicyclic gear (403), and the outer bevel wheel (404), and then through the one-way transmission (301), for driving the output shaft (3000) to produce the first rotary direction output to constitute the second driving gear train.

Figure 7:
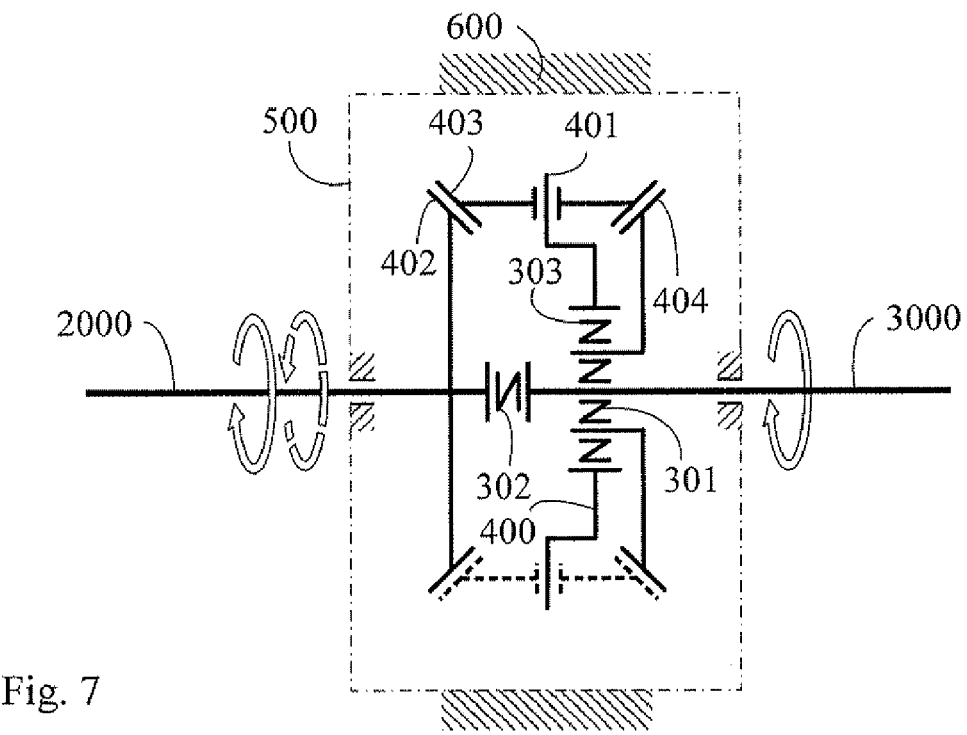
FIG. 7 is a structural schematic view showing the 7th embodiment of the coaxial epicyclic gear train with bidirectional input and one-way output constituted by the epicyclic gear train, according to the present invention.

FIG. 7 is a structural schematic view showing the 7th embodiment of the coaxial epicyclic gear train with bidirectional input and one-way output constituted by the epicyclic gear train, according to the present invention.

As shown in FIG. 7, the coaxial epicyclic gear train with bidirectional input and one-way output is constituted by the epicyclic gear train with the input shaft and the output shaft coaxially installed in series, the main components including:

one end of the input shaft (2000) through installed at one side of the shell of the transmission gear train (500) via bearing structure, another end of the input shaft (2000) and the output shaft (3000) coaxially installed in series via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) integrated with the inner bevel wheel (402);

the epicyclic gear (403) installed between the outer bevel wheel (404) and the inner bevel wheel (402); the center of the epicyclic gear (403) rotating at the epicyclic gear shaft (401), the epicyclic gear shaft (401) integrated with the epicyclic gear support arm annular shelf (400), and the one-way transmission (303) installed between the epicyclic gear support arm annular shelf (400) and the outer bevel wheel (404);

the shell of the transmission gear train (500) fixed at the machine body (600);

the outer bevel wheel (404) surrounding the output shaft (3000) via the one-way transmission (301);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the inner bevel wheel (402), the epicyclic gear (403), and the outer bevel wheel (404), and then through the one-way transmission (301), for driving the output shaft (3000) to produce the first rotary direction output to constitute the second driving gear train.

Figure 8:
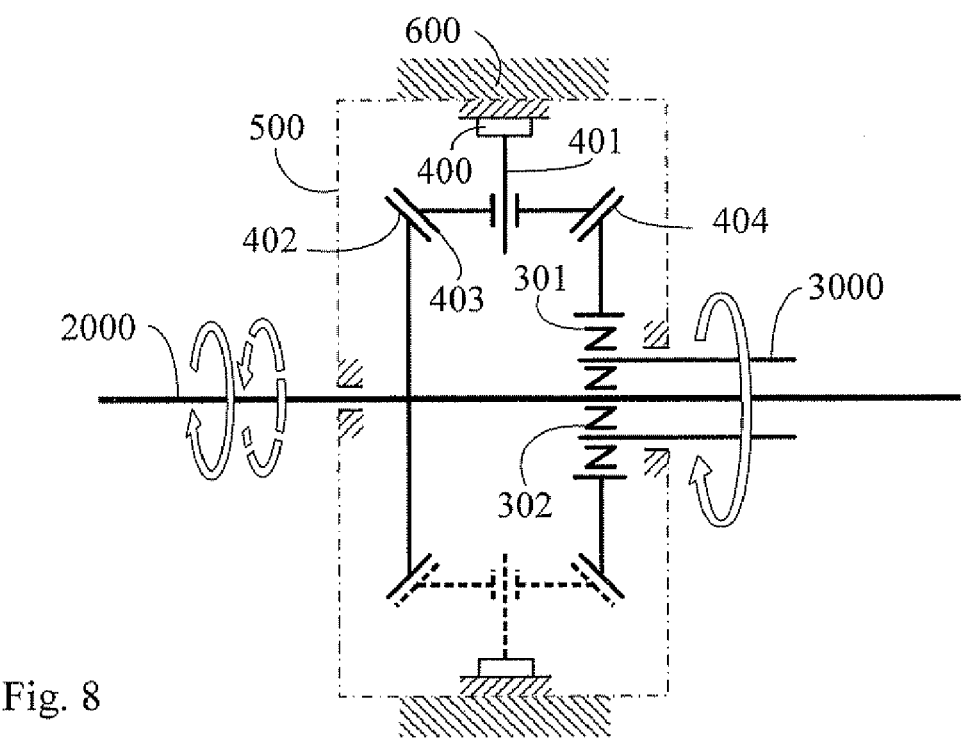
FIG. 8 is a structural schematic view showing the 8th embodiment of the coaxial epicyclic gear train with bidirectional input and one-way output constituted by the epicyclic gear train, according to the present invention.

FIG. 8 is a structural schematic view showing the 8th embodiment of the coaxial epicyclic gear train with bidirectional input and one-way output constituted by the epicyclic gear train, according to the present invention.

As shown in FIG. 8, the coaxial epicyclic gear train with bidirectional input and one-way output is constituted by the epicyclic gear train with the input shaft and the output shaft coaxial fitting, the main components including:

one end of the input shaft (2000) through installed at one side of the shell of the transmission gear train (500) via bearing structure, another end of the input shaft (2000) through the output shaft (3000) via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) integrated with the inner bevel wheel (402);

the epicyclic gear (403) installed between the outer bevel wheel (404) and the inner bevel wheel (402); the center of the epicyclic gear (403) rotating at the epicyclic gear shaft (401), one end of the epicyclic gear shaft (401) integrated with the epicyclic gear support arm annular shelf (400), the epicyclic gear support arm annular shelf (400) fixed at the shell of the transmission gear train (500);

the shell of the transmission gear train (500) fixed at the machine body (600);

the one-way transmission (301) installed between the outer bevel wheel (404) and the output shaft (3000);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (301) for driving the output shaft (3000) to produce the first rotary direction output to constitute the first driving gear train;

by way of the above structure, the input shaft (2000) is driven at the second rotary direction, through the inner bevel wheel (402) for further driving the epicyclic gear (403) and the outer bevel wheel (404), and through the outer bevel wheel (404) and the one-way transmission (301), for driving the output shaft (3000) to produce the first rotary direction output to constitute the second driving gear train.

Figure 9:
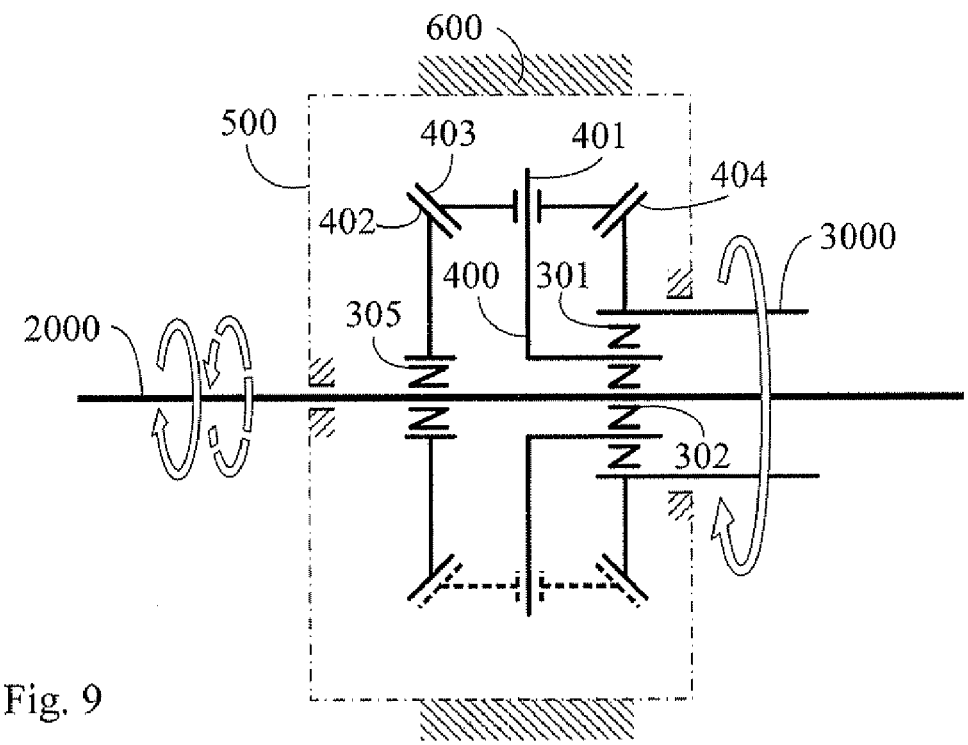
FIG. 9 is a structural schematic view showing the 9th embodiment of the coaxial epicyclic gear train with bidirectional input and one-way output constituted by the epicyclic gear train, according to the present invention.

FIG. 9 is a structural schematic view showing the 9th embodiment of the coaxial epicyclic gear train with bidirectional input and one-way output constituted by the epicyclic gear train, according to the present invention.

As shown in FIG. 9, the coaxial epicyclic gear train with bidirectional input and one-way output is constituted by the epicyclic gear train with the input shaft and the output shaft coaxial fitting, the main components including:

one end of the input shaft (2000) through installed at one side of the shell of the transmission gear train (500) via bearing structure, another end of the input shaft (2000) through the output shaft (3000) via the one-way transmission (302), the epicyclic gear support arm annular shelf (400) and the one-way transmission (301), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the one-way transmission (305) installed between the input shaft (2000) and the inner bevel wheel (402);

the epicyclic gear (403) installed between the outer bevel wheel (404) and the inner bevel wheel (402); the epicyclic gear (403) rotating at the epicyclic gear shaft (401), the epicyclic gear shaft (401) installed at the epicyclic gear support arm annular shelf (400), and the epicyclic gear support arm annular shelf (400) coaxially installed between the one-way transmission (301) and the one-way transmission (302);

the shell of the transmission gear train (500) fixed at the machine body (600);

the one-way transmission (301) installed between the outer bevel wheel (404) and the epicyclic gear support arm annular shelf (400);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) and the one-way transmission (301) for driving the output shaft (3000) to produce the first rotary direction output to constitute the first driving gear train;

by way of the above structure, the input shaft (2000) is driven at the second rotary direction, through the one-way transmission (305) for driving the epicyclic gear (403) and the outer bevel wheel (404), and for driving the output shaft (3000) to produce the first rotary direction output to constitute the second driving gear train.

Figure 10:
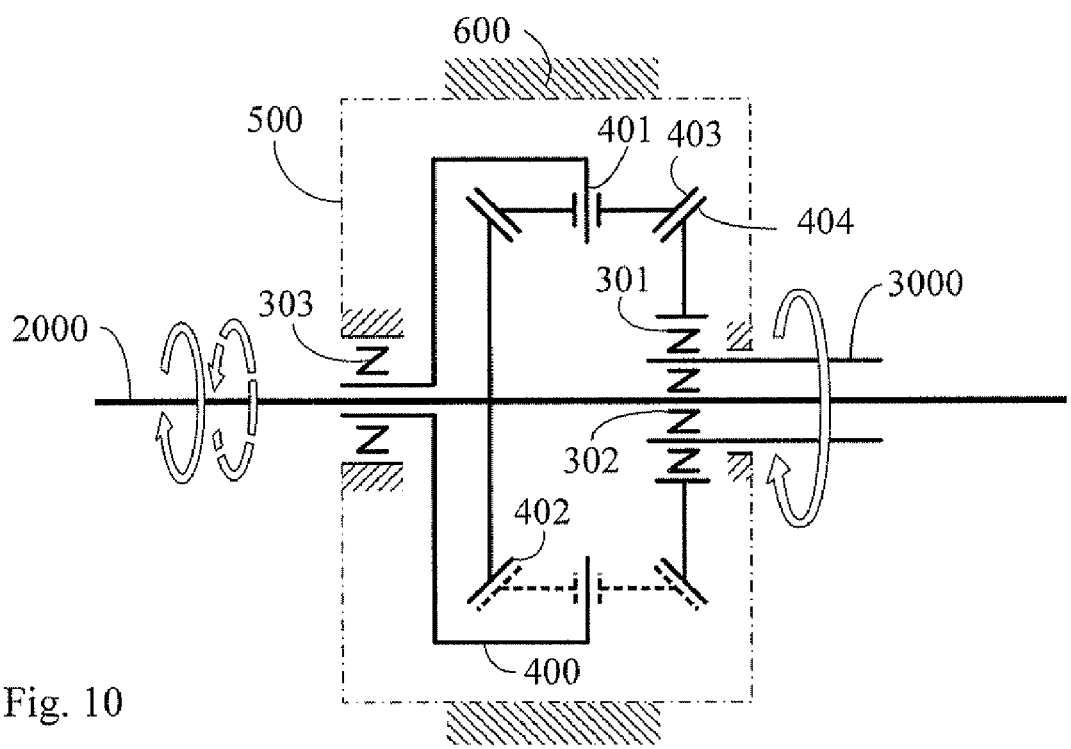
FIG. 10 is a structural schematic view showing the 10th embodiment of the coaxial epicyclic gear train with bidirectional input and one-way output constituted by the epicyclic gear train, according to the present invention.

FIG. 10 is a structural schematic view showing the 10th embodiment of the coaxial epicyclic gear train with bidirectional input and one-way output constituted by the epicyclic gear train, according to the present invention.

As shown in FIG. 10, the coaxial epicyclic gear train with bidirectional input and one-way output is constituted by the epicyclic gear train with the input shaft and the output shaft coaxial fitting, the main components including:

one end of the input shaft (2000) through installed at the epicyclic gear support arm annular shelf (400) via bearing structure, the epicyclic gear support arm annular shelf (400) integrated with one side of the shell of the transmission gear train (500) via the one-way transmission (303), another end of the input shaft (2000) through the output shaft (3000) via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) integrated with the inner bevel wheel (402);

the epicyclic gear (403) installed between the outer bevel wheel (404) and the inner bevel wheel (402); the center of the epicyclic gear (403) rotating at the epicyclic gear shaft (401), the epicyclic gear shaft (401) integrated with the epicyclic gear support arm annular shelf (400), and the epicyclic gear support arm annular shelf (400) rotating between the input shaft (2000) and the one-way transmission (303);

the shell of the transmission gear train (500) fixed at the machine body (600);

the outer bevel wheel (404) surrounding the output shaft (3000) via the one-way transmission (301);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the inner bevel wheel (402), the epicyclic gear (403), and the outer bevel wheel (404), and then through the one-way transmission (301), for driving the output shaft (3000) to produce the first rotary direction output to constitute the second driving gear train.

Figure 11:
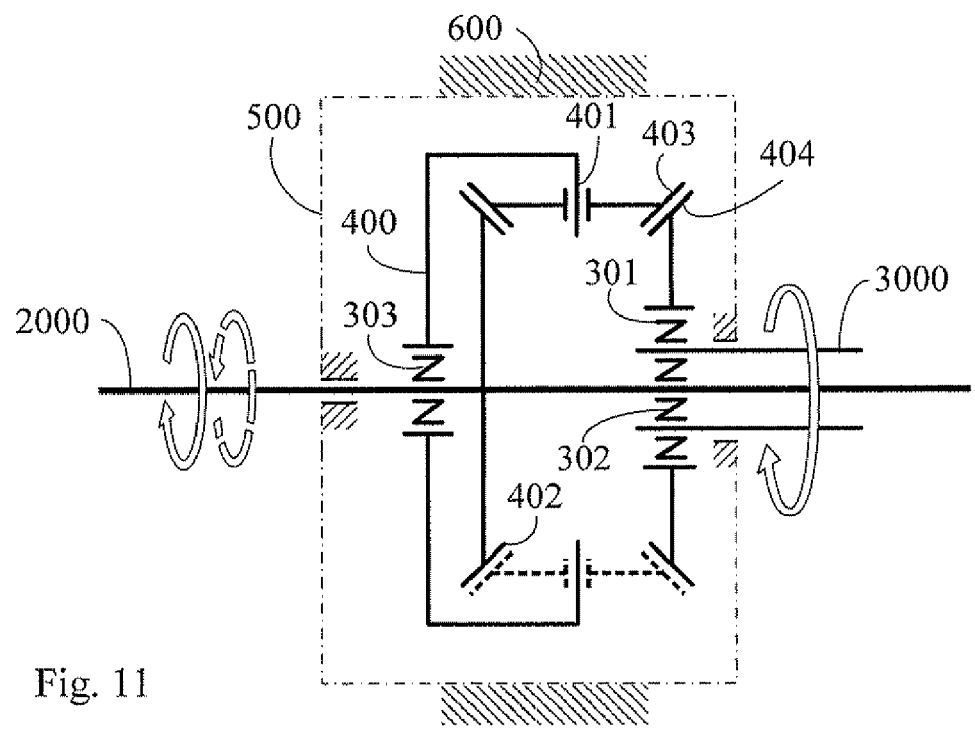
FIG. 11 is a structural schematic view showing the 11th embodiment of the coaxial epicyclic gear train with bidirectional input and one-way output constituted by the epicyclic gear train, according to the present invention.

FIG. 11 is a structural schematic view showing the 11th embodiment of the coaxial epicyclic gear train with bidirectional input and one-way output constituted by the epicyclic gear train, according to the present invention.

As shown in FIG. 11, the coaxial epicyclic gear train with bidirectional input and one-way output is constituted by the epicyclic gear train with the input shaft and the output shaft coaxial fitting, the main components including:

one end of the input shaft (2000) through installed at one side of the shell of the transmission gear train (500) via bearing structure, another end of the input shaft (2000) through the output shaft (3000) via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) integrated with the inner bevel wheel (402);

the epicyclic gear (403) installed between the outer bevel wheel (404) and the inner bevel wheel (402); the center of the epicyclic gear (403) rotating at the epicyclic gear shaft (401), the epicyclic gear shaft (401) integrated with the epicyclic gear support arm annular shelf (400) near the shell of the transmission gear train (500), and the one-way transmission (303) installed between the epicyclic gear support arm annular shelf (400) and the input shaft (2000);

the shell of the transmission gear train (500) fixed at the machine body (600);

the outer bevel wheel (404) surrounding the output shaft (3000) via the one-way transmission (301);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the inner bevel wheel (402), the epicyclic gear (403), and the outer bevel wheel (404), and then through the one-way transmission (301), for driving the output shaft (3000) to produce the first rotary direction output to constitute the second driving gear train.

Figure 12:
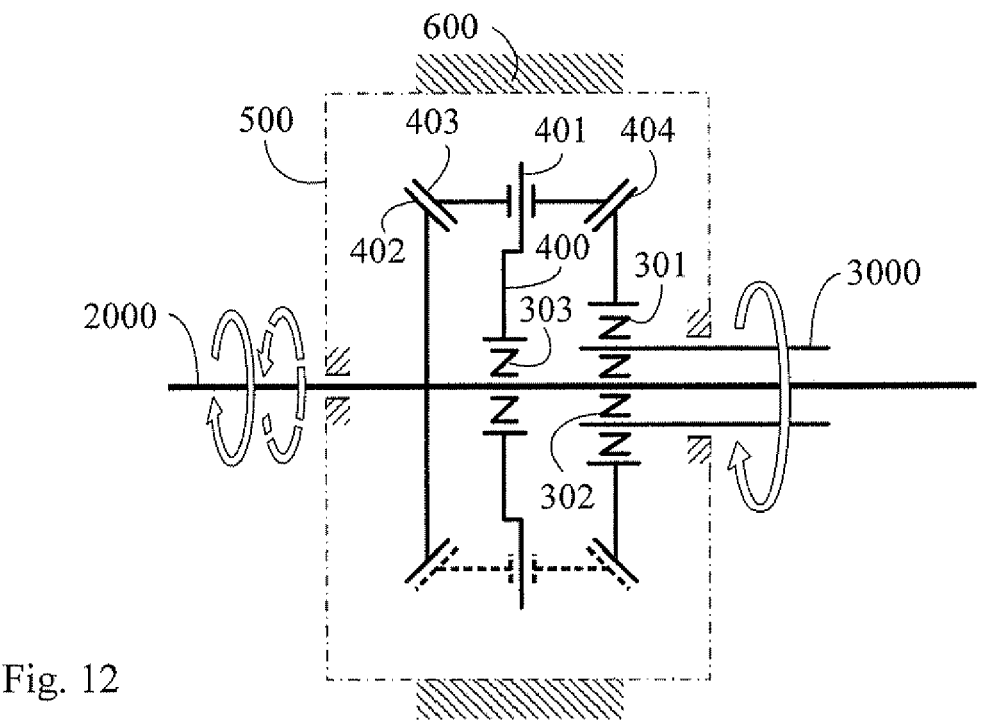
FIG. 12 is a structural schematic view showing the 12th embodiment of the coaxial epicyclic gear train with bidirectional input and one-way output constituted by the epicyclic gear train, according to the present invention.

FIG. 12 is a structural schematic view showing the 12th embodiment of the coaxial epicyclic gear train with bidirectional input and one-way output constituted by the epicyclic gear train, according to the present invention.

As shown in FIG. 12, the coaxial epicyclic gear train with bidirectional input and one-way output is constituted by the epicyclic gear train with the input shaft and the output shaft coaxial fitting, the main components including:

- one end of the input shaft (2000) through installed at one side of the shell of the transmission gear train (500) via bearing structure, another end of the input shaft (2000) through the output shaft (3000) via the one-way transmission (302), and a bearing installed between the output shaft (3000) and the shell of the transmission gear train (500);
- shell of the transmission gear train (500): machine parts installed for constituting the coaxial epicyclic gear train with bidirectional input and one-way output;
- machine body (600): relatively static organization structure;
- the input shaft (2000) integrated with the inner bevel wheel (402);
- the epicyclic gear (403) installed between the outer bevel wheel (404) and the inner bevel wheel (402); the center of the epicyclic gear (403) rotating at the epicyclic gear shaft (401), the epicyclic gear shaft (401) integrated with the epicyclic gear support arm annular shelf (400) installed between the inner bevel wheel (402) and the one-way transmission (302), and the one-way transmission (303) installed between the epicyclic gear support arm annular shelf (400) and the input shaft (2000);
- the shell of the transmission gear train (500) fixed at the machine body (600);
- the outer bevel wheel (404) surrounding the output shaft (3000) via the one-way transmission (301);
- the inner bevel wheel (402), the epicyclic gear (403), and the outer bevel wheel (404) constituted by gears or friction wheels;
- the epicyclic gear (403) driven by the inner bevel wheel (402), in which the status of the transmission ratio is for acceleration, deceleration, or constant velocity;
- the outer bevel wheel (404) driven by the epicyclic gear (403), in which the status of the transmission ratio is for acceleration, deceleration, or constant velocity;
- by way of the above structure, the input shaft (2000) driven at the first rotary direction, through the one-way transmission (302) for driving the output shaft (3000) to produce the first rotary direction output to constitute the first driving gear train;
- by way of the above structure, the input shaft (2000) is driven at the second rotary direction, through the inner bevel wheel (402), the epicyclic gear (403), and the outer bevel wheel (404), and then through the one-way transmission (301), for driving the output shaft (3000) to produce the first rotary direction output to constitute the second driving gear train.

Figure 13:
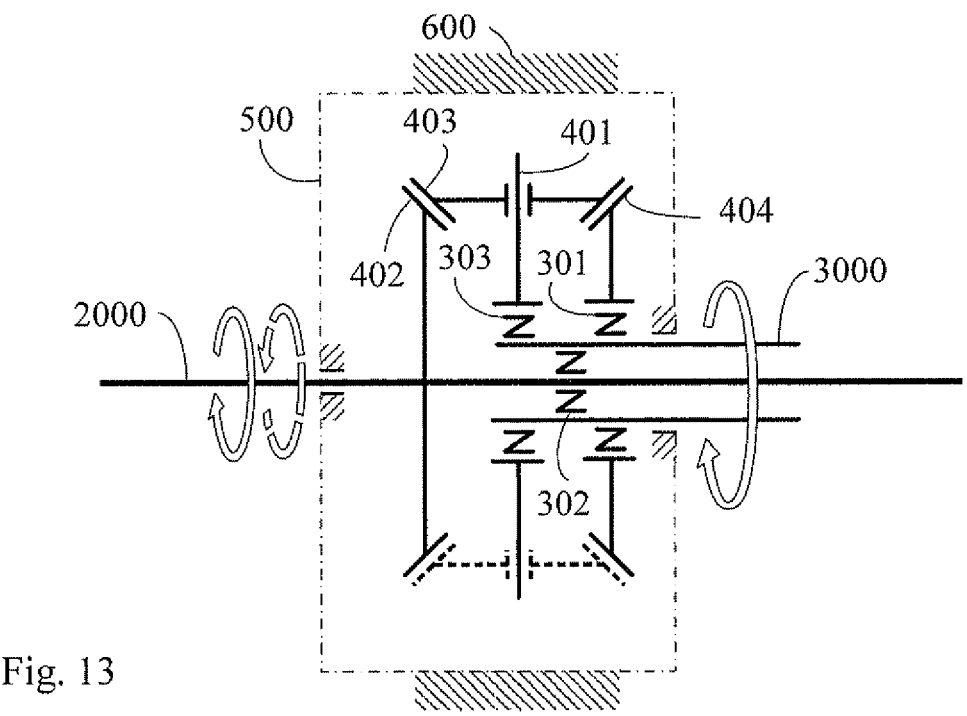
FIG. 13 is a structural schematic view showing the 13th embodiment of the coaxial epicyclic gear train with bidirectional input and one-way output constituted by the epicyclic gear train, according to the present invention.

FIG. 13 is a structural schematic view showing the 13th embodiment of the coaxial epicyclic gear train with bidirectional input and one-way output constituted by the epicyclic gear train, according to the present invention.

As shown in FIG. 13, the coaxial epicyclic gear train with bidirectional input and one-way output is constituted by the epicyclic gear train with the input shaft and the output shaft coaxial fitting, the main components including:

- one end of the input shaft (2000) through installed at one side of the shell of the transmission gear train (500) via bearing structure, another end of the input shaft (2000) through the output shaft (3000) via the one-way transmission (302), and a bearing installed between the output shaft (3000) and the shell of the transmission gear train (500);
- shell of the transmission gear train (500): machine parts installed for constituting the coaxial epicyclic gear train with bidirectional input and one-way output;
- machine body (600): relatively static organization structure;
- the input shaft (2000) integrated with the inner bevel wheel (402);
- the epicyclic gear (403) installed between the outer bevel wheel (404) and the inner bevel wheel (402); the center of the epicyclic gear (403) rotating at the epicyclic gear shaft (401), the epicyclic gear shaft (401) integrated with the epicyclic gear support arm annular shelf (400) installed at the output shaft (3000), and the one-way transmission (303) installed between the epicyclic gear support arm annular shelf (400) and the output shaft (3000);
- the shell of the transmission gear train (500) fixed at the machine body (600);
- the outer bevel wheel (404) surrounding the output shaft (3000) via the one-way transmission (301);
- the inner bevel wheel (402), the epicyclic gear (403), and the outer bevel wheel (404) constituted by gears or friction wheels;
- the epicyclic gear (403) driven by the inner bevel wheel (402), in which the status of the transmission ratio is for acceleration, deceleration, or constant velocity;
- the outer bevel wheel (404) driven by the epicyclic gear (403), in which the status of the transmission ratio is for acceleration, deceleration, or constant velocity;
- by way of the above structure, the input shaft (2000) driven at the first rotary direction, through the one-way transmission (302) for driving the output shaft (3000) to produce the first rotary direction output to constitute the first driving gear train;
- by way of the above structure, the input shaft (2000) is driven at the second rotary direction, through the inner bevel wheel (402), the epicyclic gear (403), and the outer bevel wheel (404), and then through the one-way transmission (301), for driving the output shaft (3000) to produce the first rotary direction output to constitute the second driving gear train.

Figure 14:
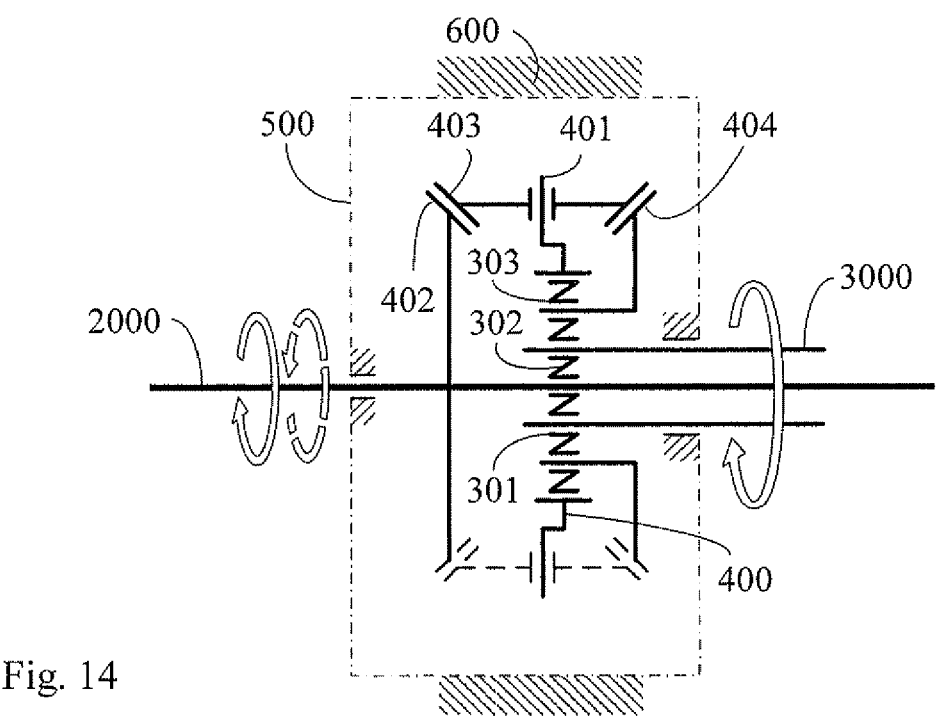
FIG. 14 is a structural schematic view showing the 14th embodiment of the coaxial epicyclic gear train with bidirectional input and one-way output constituted by the epicyclic gear train, according to the present invention.

FIG. 14 is a structural schematic view showing the 14th embodiment of the coaxial epicyclic gear train with bidirectional input and one-way output constituted by the epicyclic gear train, according to the present invention.

As shown in FIG. 14, the coaxial epicyclic gear train with bidirectional input and one-way output is constituted by the epicyclic gear train with the input shaft and the output shaft coaxial fitting, the main components including:

- one end of the input shaft (2000) through installed at one side of the shell of the transmission gear train (500) via bearing structure, another end of the input shaft (2000) through the output shaft (3000) via the one-way transmission (302), and a bearing installed between the output shaft (3000) and the shell of the transmission gear train (500);

shell of the transmission gear train (500): machine parts installed for constituting the coaxial epicyclic gear train with bidirectional input and one-way output;

machine body (600): relatively static organization structure;

the input shaft (2000) integrated with the inner bevel wheel (402);

the epicyclic gear (403) installed between the outer bevel wheel (404) and the inner bevel wheel (402); the center of the epicyclic gear (403) rotating at the epicyclic gear shaft (401), the epicyclic gear shaft (401) integrated with the epicyclic gear support arm annular shelf (400), and the one-way transmission (303) installed between the epicyclic gear support arm annular shelf (400) and the outer bevel wheel (404);

the shell of the transmission gear train (500) fixed at the machine body (600);

the outer bevel wheel (404) surrounding the output shaft (3000) via the one-way transmission (301);

the inner bevel wheel (402), the epicyclic gear (403), and the outer bevel wheel (404) constituted by gears or friction wheels;

the epicyclic gear (403) driven by the inner bevel wheel (402), in which the status of the transmission ratio is for acceleration, deceleration, or constant velocity;

the outer bevel wheel (404) driven by the epicyclic gear (403), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the inner bevel wheel (402), the epicyclic gear (403), and the outer bevel wheel (404), and then through the one-way transmission (301), for driving the output shaft (3000) to produce the first rotary direction output to constitute the second driving gear train.

The invention claimed is:

1. A coaxial epicyclic transmission with bidirectional input and one-way output, comprising:
an epicyclic gear train shell (500);
an input shaft (2000) rotatably mounted on a first side of the transmission gear train shell (500) and arranged to be driven in a first rotary direction and a second rotary direction opposite to the first rotary direction;
an output shaft (3000) rotatably mounted on a second side of the transmission gear train shell (500) and installed coaxially and in series with the input shaft (2000);
an epicyclic gear support arm (400) from which extends an epicyclic gear shaft (401);
an epicyclic gear train including:
an inner bevel wheel (402) rotatable with the input shaft (2000);
an epicyclic gear (403) engaged with the inner bevel wheel (402) and mounted on the epicyclic gear shaft (401);
an outer bevel wheel (404) engaged with the epicyclic gear (403); and
a first one-way transmission (301) coupled between the output shaft (3000) and the outer bevel wheel (404);
a second one-way transmission (303) coupled between the epicyclic gear support arm (400) and one of the transmission gear train shell (500), the input shaft (2000), the outer bevel wheel (404), and the output shaft (3000); and
a third one-way transmission (302) coupled between the input shaft (2000) and the output shaft (3000), wherein:
when the input shaft is driven in the first rotary direction, power is transmitted directly between the input shaft (2000) and the output shaft (3000) to cause rotation of the output shaft (3000) in a first output direction, and
when the input shaft (2000) is driven in the second rotary direction, rotation of the inner bevel wheel (402) causes rotation of the epicyclic gear (403) about an axis of the epicyclic gear shaft (401), which causes rotation of the outer bevel wheel (404), which causes rotation of the output shaft (3000) through the first one-way transmission (301) in the first output direction, thereby transmitting power from the input shaft (2000) to the output shaft (3000) through the epicyclic gear train to cause rotation of the output shaft (3000) in said first output direction.

2. A coaxial epicyclic transmission with bidirectional input and one-way output as recited in claim 1, wherein said second one-way transmission (303) is coupled between the epicyclic gear support arm (400) and the transmission gear train shell (500).

3. A coaxial epicyclic transmission with bidirectional input and one-way output as recited in claim 2, wherein said third one-way transmission (302) is coupled between respective ends of said input shaft (2000) and said output shaft (3000).

4. A coaxial epicyclic transmission with bidirectional input and one-way output as recited in claim 2, wherein said input shaft (2000) extends into said output shaft (3000), and said third one-way transmission (302) is situated within said output shaft (3000) between the input shaft (2000) and the output shaft (3000).

5. A coaxial epicyclic transmission with bidirectional input and one-way output as recited in claim 3, wherein said second one-way transmission (303) is coupled between the epicyclic gear support arm (400) and the input shaft (2000).

6. A coaxial epicyclic transmission with bidirectional input and one-way output as recited in claim 3, wherein said second one-way transmission (303) is coupled between the epicyclic gear support arm (400) and the output shaft (3000).

7. A coaxial epicyclic transmission with bidirectional input and one-way output as recited in claim 3, wherein said second one-way transmission (303) is coupled between the epicyclic gear support arm (400) and the outer bevel gear (404).

8. A coaxial epicyclic transmission with bidirectional input and one-way output as recited in claim 1, wherein said third one-way transmission (302) is coupled between respective ends of said input shaft (2000) and said output shaft (3000).

9. A coaxial epicyclic transmission with bidirectional input and one-way output as recited in claim 1, wherein said input shaft (2000) extends into said output shaft (3000), and said third one-way transmission (302) is situated within said output shaft (3000) between the input shaft (2000) and the output shaft (3000).

10. A coaxial epicyclic transmission with bidirectional input and one-way output as recited in claim 1, wherein said epicyclic gear support arm (400) extends around said inner bevel wheel (402) and said epicyclic gear (403).

11. A coaxial epicyclic transmission with bidirectional input and one-way output as recited in claim 1, wherein said epicyclic gear support arm (400) extends between said epicyclic gear (403) and one of said input shaft (2000) and said output shaft (3000).

12. A coaxial epicyclic transmission with bidirectional input and one-way output as recited in claim 1, wherein a transmission ratio of said third one-way transmission (302) between said input shaft (2000) and said output shaft (3000)

is different from a transmission ratio of said epicyclic gear train between said input shaft (2000) and said output shaft (3000), wherein a direction in which said input shaft (2000) is driven determines the output transmission ratio of said coaxial epicyclic transmission.

13. A coaxial epicyclic transmission with bidirectional input and one-way output as recited in claim 1, wherein the input shaft (2000) is driven by human power, machine power, a hydraulic or pneumatic motor, or an electric motor.

14. A coaxial epicyclic transmission with bidirectional input and one-way output as recited in claim 1, wherein said inner bevel wheel (402), said epicyclic gear (403), and said outer bevel wheel (404) are selected from the group consisting of gears and friction wheels.

\* \* \* \* \*